United States Patent [19]

Beck et al.

[11] Patent Number: 5,221,507
[45] Date of Patent: Jun. 22, 1993

[54] PROCESS FOR COINJECTION MOLDING OF PREFORMS FOR MULTI-LAYER CONTAINERS

[75] Inventor: Martin H. Beck, Merrimack; George Rollend, Amherst both of N.H.

[73] Assignee: Devtech Labs, Inc., Amherst, N.H.

[21] Appl. No.: 651,274

[22] Filed: Feb. 5, 1991

Related U.S. Application Data

[62] Division of Ser. No. 513,894, Apr. 24, 1990, Pat. No. 5,040,963.

[51] Int. Cl.$^5$ ............... B29C 45/16; B29C 45/78
[52] U.S. Cl. ............... 264/255; 264/513; 264/297.2; 264/328.8; 264/328.14; 264/328.16; 264/328.19
[58] Field of Search ........... 264/255, 513, 516, 328.8, 264/328.19, 297.2, 328.14, 328.16; 425/130, 560, 564

[56] References Cited

U.S. PATENT DOCUMENTS

| | | |
|---|---|---|
| 3,740,180 | 6/1973 | Sidur . |
| 3,873,656 | 3/1975 | Garner . |
| 3,888,612 | 6/1975 | Schrewe et al. . |
| 3,947,175 | 3/1976 | Melcher . |
| 3,972,664 | 8/1976 | Fillmann . |
| 4,029,454 | 6/1977 | Monnet . |
| 4,124,308 | 11/1978 | Sokolow ............... 264/328.12 |
| 4,174,413 | 11/1979 | Yasuike et al. ............... 264/328.12 |
| 4,390,332 | 6/1983 | Hendry ............... 425/570 |
| 4,459,257 | 7/1984 | Baciu ............... 264/255 |
| 4,525,134 | 6/1985 | McHenry et al. ............... 264/513 |
| 4,535,901 | 8/1985 | Okudaira et al. . |
| 4,550,043 | 10/1985 | Beck ............... 220/415 |
| 4,609,516 | 9/1986 | Krishnakumar et al. . |
| 4,657,496 | 4/1987 | Ozeki et al. . |
| 4,710,118 | 12/1987 | Krishnakumar et al. . |
| 4,715,802 | 12/1987 | Arai . |
| 4,726,751 | 2/1988 | Shibata et al. ............... 425/588 |
| 4,728,549 | 3/1988 | Shimizu et al. . |
| 4,751,035 | 6/1988 | McHenry et al. ............... 425/564 |
| 4,752,199 | 6/1988 | Aria ............... 425/130 |
| 4,761,343 | 8/1988 | Gellert ............... 425/547 |
| 4,784,819 | 11/1988 | Spurr ............... 425/564 |
| 4,816,308 | 3/1989 | Shimizu et al. . |
| 4,863,665 | 9/1989 | Schad et al. ............... 264/328.4 |
| 5,040,963 | 8/1991 | Beck et al. ............... 264/297.2 |

FOREIGN PATENT DOCUMENTS

| | | |
|---|---|---|
| 0161189 | 5/1985 | European Pat. Off. . |
| 0161185 | 4/1986 | European Pat. Off. . |
| 0170594 | 7/1986 | European Pat. Off. . |

OTHER PUBLICATIONS

Recyle '89, International Management Forum, Davos/-Switzerland Apr., 10 -Apr. 13, 1989, Polymers, Processing, Applications Business Development and Marketing, pp. 120–136.
Plastics Today, Dual-density Structural Foam by Romano Discacciati and Ralph J. Heddon, p. 21, Aug. 5, 1989.
PM&E, Multiconference Report Part II: Multilayer Advances by Ed Galli, pp. 27–29, Jan. 1986.
Plastics Technology, New Materials, Machinery, Process: The Packaging Revolution Continues, pp. 43–53, Nov. 1984.
Plastic World, Feb. 1985 p. 45.

*Primary Examiner*—Jan H. Silbaugh
*Assistant Examiner*—Angela Y. Ortiz
*Attorney, Agent, or Firm*—Davis, Bujold & Streck

[57] ABSTRACT

A multi-cavity injection mold process, for simultaneously injection molding a plurality of multi-layer articles, having a single hot runner manifold system for the sequential supply of first and second molten molding materials to the cavities of the mold with each of the materials being supplied simultaneously to all cavities in equal quantities. The process also uses a core rod for each cavity in which a concavity is provided, adjacent the entry point of the materials into the cavity, to prevent the first injected material in an injection cycle from being washed from the end of the core rod by the second injected material, the use of a buffer of the first injected material in the neck region of the preform to compensate for variations in temperature of the cavities and material being distributed to different parts of the mold and the use of the first part of the metered quantity of the first to be injected material from the next injection cycle to seal the preform at the end of the injection cycle.

8 Claims, 2 Drawing Sheets

PROCESS FOR COINJECTION MOLDING OF PREFORMS FOR MULTI-LAYER CONTAINERS

This Application is a Divisional Application of patent application Ser. No. 07/513,894 filed Apr. 24, 1990, now U.S. Pat. No. 5,040,963.

This invention relates to coinjection molding of multi-layered articles such as preforms for the blow molding of multi-layered containers.

It is to be appreciated that the terminology of first and second materials, as used herein, is intended to cover at least two materials which are sequentially supplied to an injection mold, it being entirely possible that one or more other materials may be sequentially supplied before, between, or after the first and second materials.

The manufacture of preforms for blow molding containers made from 100% virgin resin is well known in prior art. Substituting 100% recycled material in the preforms, or blending virgin material with recycled material, which is acquired from post consumer solid waste presents several significant problems. Specifically, if the recycled material (e.g. PET) comes into contact with a food product the cleanliness of the recycled material must be assured. At the present time the Food and Drug Administration (FDA) will not permit any food to contact recycled PET. Additionally, recycled PET is degraded relative to virgin material. By the use of multi-layered containers in which the interior and exterior surfaces of the container comprise virgin material while the interior of the walls of the container comprises recycled material, the economies and conservation which may be derived from the use of recycled materials is achieved while at the same time problems associated with the use of recycled material are overcome.

Coinjection molding of preforms for use in blow molding is known in the prior art. The formation of such containers is described in detail, for example, in Applicant's U.S. Pat. No. 4,550,043.

Both single material preforms and multi-layered preforms are injection molded in multi-cavity molds which may have as many as 96 cavities, into which the material, from which the preforms are to be formed, is injected simultaneously thereby simultaneously to produce a preform in each of the cavities. To this end the mold defines a manifold arrangement to convey the material, which will form the preform, to the cavities and it is known in such an arrangement to repeatedly divide the material flow whereby the flow path from the material inlet of the mold to the cavity is the same for each cavity whereby each cavity will receive an equal metered amount of material at substantially the same temperature and at substantially the same time as every other cavity. In molds for of coinjection molding multi-layered preforms the prior art has utilized molds in which a separate manifold system for each material is used to convey that material through the mold to the cavities with the materials either being injected simultaneously into the cavities using concentric nozzles or each material being injected sequentially into the cavities utilizing a valve arrangement closely adjacent each cavity to control the flow from the separate manifolds. Such arrangements result in molds that are expensive and complex. In addition, such molds result in difficulties in controlling the temperature of the material to be injected into the cavity in a manner such that each mold receives an accurately metered quantity of material at substantially the same temperature. A secondary problem of current coinjection mold designs is that of ensuring that at the end of the injection cycle the recycled material in each preform is completely encased by a layer of virgin material. This is a particular problem at the base of the preform where difficulty is experienced in ensuring that recycled material is not exposed at the exterior of the base after the injection molding cycle is complete. Additionally, with current designs of core pins, which generally have a convex or flat ends, there is a tendency for virgin material of the preform to be washed off of the end of the core pin by the recycled material.

With large molds having a substantial number of cavities difficulties are experienced in metering exactly the same amount of material into each of the cavities as a result of the tendency for cavities near the center of the mold to be hotter than the cavities near the exterior of the mold. The result of this is that the material injected into the central cavities tends to be a little warmer and of a lower viscosity than the material injected into the outer cavities which leads to differences in the relative quantities of materials injected into the central and outer cavities. This can lead to insufficient virgin material being injected into the cooler outer cavities resulting in an incomplete virgin casing in the neck region of the preform and the consequent undesirable exposure of recycled material at this point.

It is an object of the present invention to provide a process using a multi-cavity coinjection mold avoiding the complex construction and expense of prior art multi-cavity coinjection molds and which provides a low cost, relatively simple, easy to regulate mold which is suitable for use on existing machinery at minimal conversion costs.

It is a further object of the present invention to provide a process using a core rod design which will inhibit the washing-off of virgin material from the base of the preform when recycled material is subsequently injected.

It is a further object of the present invention to provide a sequential injection process for coinjection molding preforms in which the possible exposure of recycled material in the base of the preform at the end of the injection cycle is avoided.

It is a further object of the present invention to provide an injection process for the coinjection of the multi-layered preforms in which the possible exposure of recycled material in the neck region of the preform resulting from temperature differentials between centrally located cavities and those located adjacent the exterior of the mold is avoided.

According to the invention there is provided a process for the simultaneous injection molding a plurality of multi-layer articles in a multi-cavity injection mold comprising the steps of supplying a metered quantity of a first material to a single hot runner manifold system defining a single path to each of a plurality of injection mold cavities for passage therethrough to simultaneously supply equal quantities of said first material to each said cavity and then supplying a metered quantity of a second material contiguously with said first material to said single path to each of said plurality of cavities for passage therethrough, contiguously with said first material, to simultaneously supply equal quantities of said second material to each said cavity.

According to the invention there is also provided a process for molding a multi-layer preform having exterior and interior surface layers of a first material covering an interior structure of a second material comprising the steps of sequentially and contiguously injecting said first and second materials into a cavity defining the shape of said preform, said cavity being of a temperature to freeze said first material to form said interior and exterior surface layers with the contiguously following second material between said surface layers to fill said space therebetween except at an entry point for said materials and then injecting a further quantity of said first material to seal said preform whereby no second material therein is exposed, said second injection of said first material being from a metered quantity of said first material to be used in a subsequent injection cycle.

According to the invention there is also provided in conjunction with an injection mold cavity, for injection molding a multi-layer preform, defined by a core rod disposed within a female cavity portion and a neck forming portion, connected at a base forming portion of the cavity defining a center, by way of a gate, with a molding material supply duct disposed adjacent the center of said base forming portion, wherein a base portion of said core rod adjacent said gate is provided with a concavity to accommodate a quantity of a first molding material entering the cavity through said gate thereby the process of preventing washing out of that material by a second said material when subsequentially injected into said cavity.

According to the invention there is also provided a process for injection molding a multi-layer article, especially a preform, comprising supplying a quantity of each of a first and second material sequentially and contiguously to a plurality of cavities in substantially equal amounts, each material being supplied to all said cavities substantially simultaneously, wherein said first material is injected into each said cavity to form an interior and exterior layer of said multi-layer preform with the contiguously following second material disposed therebetween, said first material being injected in sufficient quantity to provide a buffer quantity of said first material in a neck portion of said preform in each cavity to ensure closure of the neck region by the first material with expected variations temperatures of the cavities and first material.

According to the invention there is also provided a process for injection molding multi-layer preforms in a series of injection cycles wherein in each said cycle a quantity of a first material is simultaneously injected into each of a plurality of cavities to form interior and exterior surface layers of the multi-layer preforms, a quantity of said second material, contiguous with and following the quantity of first material, is then simultaneously injected between the interior and exterior surface layers to fill each cavity except for a portion thereof adjacent gate means through which said first and second materials enter said cavities and subsequentially injecting a portion of the next metered quantity of said first material, which will initiate the next injection cycle in that cavity to seal the base portion of said preform to ensure that after formation thereof, the second material is not exposed.

The invention will now be described, by way of example, with reference to the accompanying drawings, in which.

Figure 1:
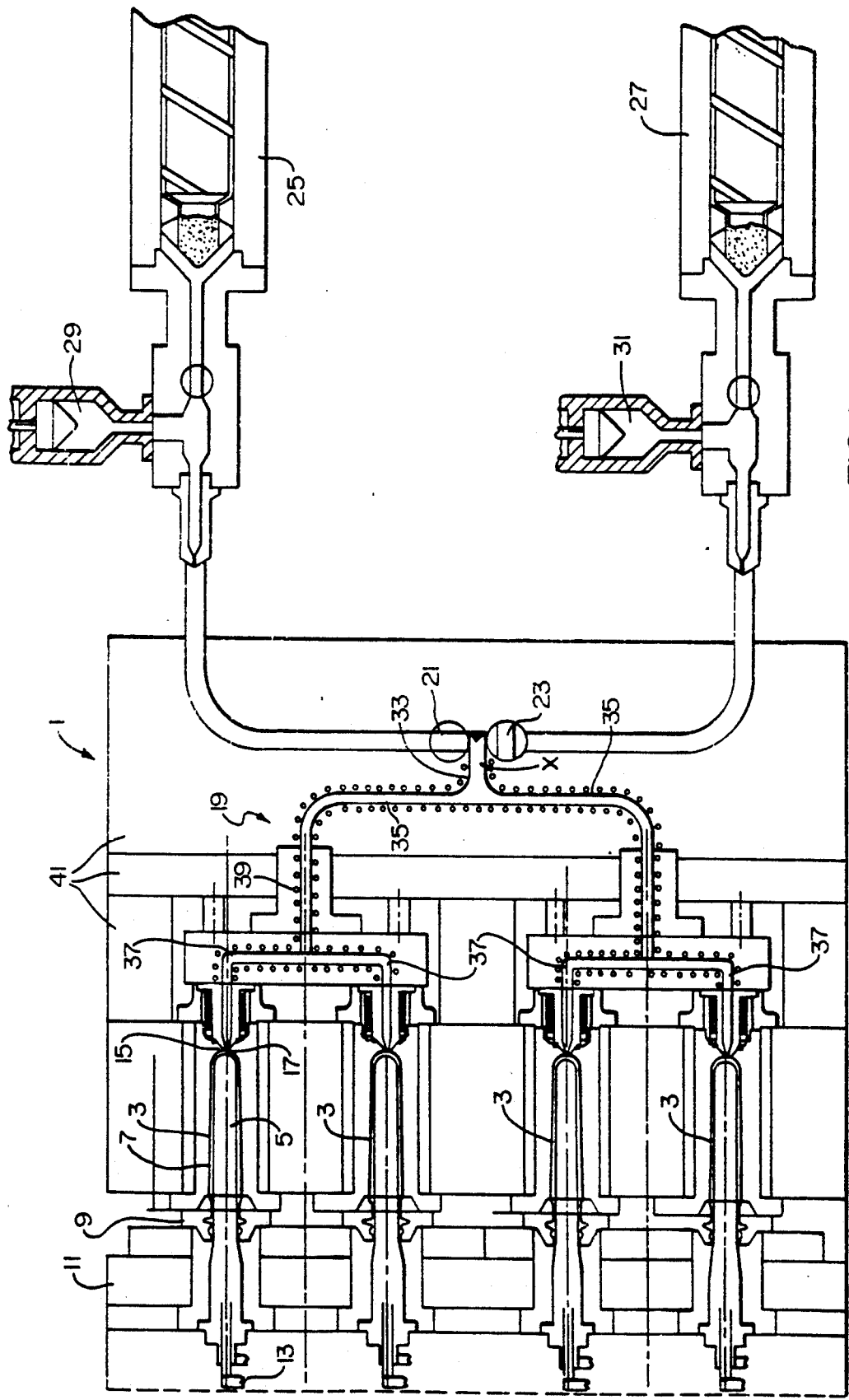
FIG. 1 is a diagrammatic cross-section of a multi-cavity sequential coinjection mold system according to the present invention.

Referring first to FIG. 1, a multi-cavity mold 1, for the sequential coinjection molding of multi-layered preforms for the blow molding of multi-layered containers comprising interior and exterior surfaces of a virgin material (e.g. PET), is illustrated as having four cavities 3. It will be appreciated that in practice mold may have forty eight, sixty four, ninety six or even more cavities. Four cavities are used in this example to simplify explanation of the present invention which is applicable to molds having any number of cavities, particularly where the number of cavities is $2^n$. Each cavity is defined by a core rod 5 and a female cavity portion 7, formed in the mold itself, together with a neck defining split neck ring 9 through which the core pin 5 extends to a core pin/split neck ring support block through which core pin cooling water may be supplied by way of cooling water tubes 13. At the base 15 of each cavity is a gate 17 through which passes the material which will form the preform in that cavity.

The mold 1 defines a hot runner manifold system illustrated generally by reference number 19 which extends from diverter valves 21 and 23 which regulate the supply of virgin and recycled molten PET from plasticizer barrels 25 and 27 respectively under the control of material metering ram pots 29 and 31. The diverter valves 21 and 23 regulate the supply of molten PET to a single hot runner 33 forming part of the manifold system 19 The hot runner 33 is divided into two hot runners 35 of identical cross-section and length and these hot runners 35 are again divided each into further hot runners 37, again of identical cross-section and length, which lead one to each cavity 3 by way of its associated gate 17. It will be appreciated, that with molds having a greater number of cavities, the hot runners would again be divided one or more times, each time into pluralities of hot runners of identical cross-section and length so that molten PET passing through the diverter valves 21 and 23 will encounter a sequence of hot runners of identical cross-section and length for each and every cavity, thereby to ensure that the molten PET is metered in substantially equal amounts simultaneously to each cavity. Heating means 39 is provided to maintain and control the temperature of the molten PET as it is distributed through the hot runners of the manifold system. To facilitate accurate temperature control the manifold system is insulated by insulating means 41.

Figure 2:
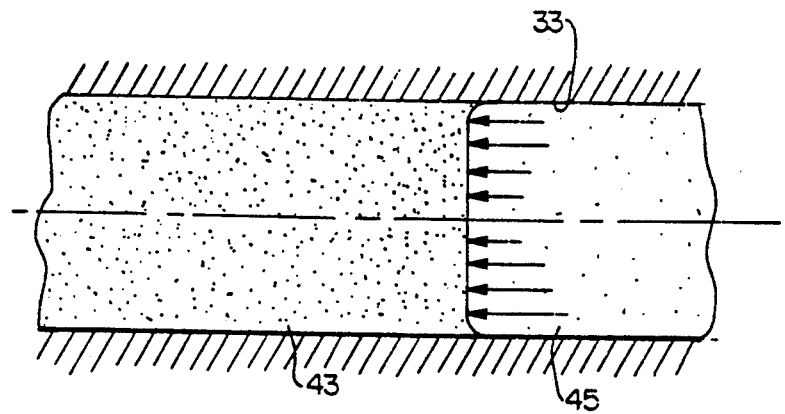
FIG. 2 illustrates diagrammatically a cross-section of the junction between two different molten materials to be sequentially injected into cavities, the cross-section being taken immediately downstream of the diverter valves of the system illustrated in FIG. 1 at arrow "X"

Construction details of the mold its manifold system, the heating means and the insulating means together with the cavity design and cooling arrangements for the core pins and cavities, the split neck rings etc. are considered to be conventional in this technology and will be readily apparent to those skilled in the art. Similarly the plasticizer barrels and ram pots are of conventional construction as are the general engineering details of the diverter valves. Accordingly these matters will not be described in detail in this application. With reference now to FIG. 2, there is diagrammatically illustrated an interface between virgin and recycled molten PET in hot runner 33 at X (See FIG. 1) when the diverter valves 21 and 23 have been operated to change the supply of molten PET from plasticizer barrel 25 and ram pot 29 to molten PET from plasticizer barrel 27 and ram pot 31. The hot runner 33 is maintained at approximately 500° F. and the frictional drag on the material is illustrated at the interface or melt front of the two materials. For the sake of illustration it may be assumed that molten PET 43 is recycled material from plasticizer barrel 25 and that molten PET 45 is virgin PET from plasticizer barrel 27.

Figure 3:
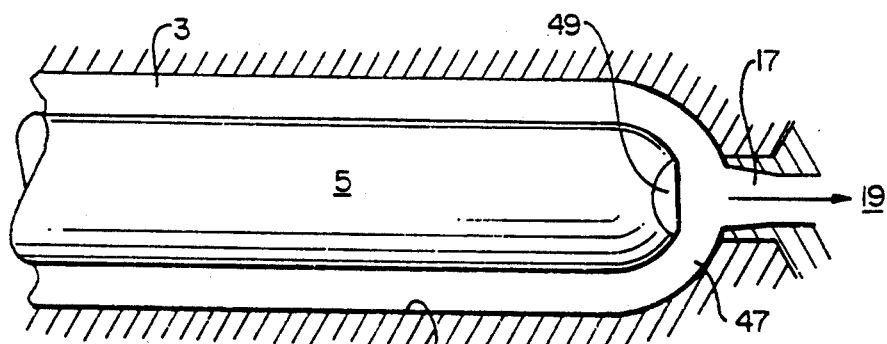
FIG. 3 is a diagrammatic cross-sectional representation illustrating the base portion of a core rod in a cavity according to the present invention.

With reference now to FIG. 3 a portion of cavity 3 of the mold 1, including the base forming portion 47, includes core rod 5 and female cavity portion 7 which is connected by way of gate 17 to the hot runner manifold system 19. Facing the gate and formed in the base forming portion of the core rod 5, which is otherwise convex, is a concavity 49. The purpose of this concavity is to capture and support a quantity of the first (virgin) PET to enter the cavity during an injection molding cycle without the virgin material being washed off of the end of the core rod when the second (recycled) PET is injected.

Figure 4:
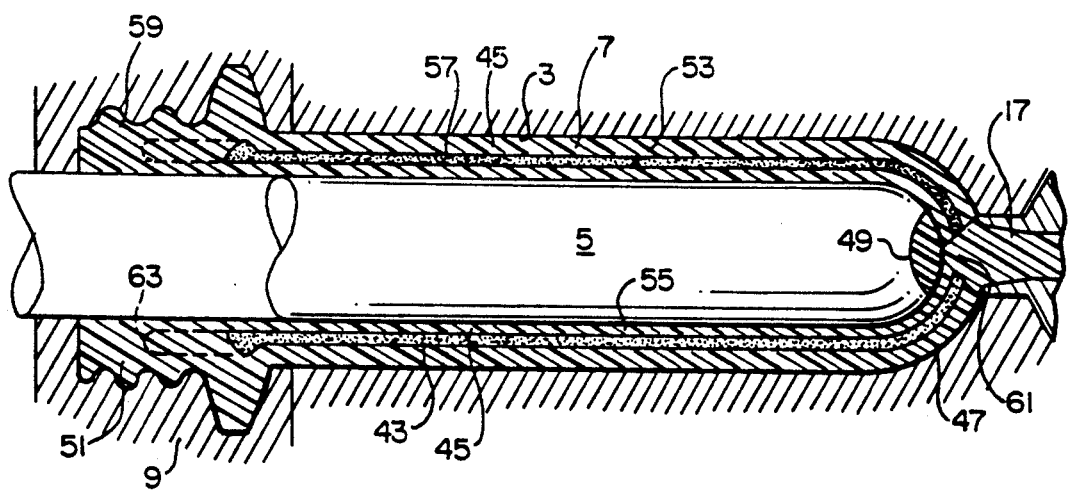
FIG. 4 is a diagrammatic cross-section of one cavity of the mold system illustrated in FIG. 1 showing the distribution of materials in a preform formed therein.

With reference now to FIG. 4 the sequence of injection of molten materials and the formation of the multi-layer coinjected preform will be described. At the beginning of an injection cycle, a metered quantity of molten virgin PET is supplied through the manifold system 19 of gate 17 into cavity 3 to flow therethrough to the neck portion 51. This molten PET follows an identical path through the hot runners to each of the multiple cavities 3 of the mold 1. As a consequence of this and the temperature control of the hot runners, a substantially identical metered quantity at substantially equal temperatures is supplied to each cavity 3 simultaneously. As this molten virgin PET 45 flows through each cavity 3 it meets the cooled core pin 5 and cool surface 7 of the cavity which serve to freeze the PET in contact therewith thereby to form the interior and exterior surface layers of the preform. During the first stage of the injection cycle, a quantity of the virgin molten PET is received in the concavity 49 where it is frozen, at least where it contacts the core pin to form a reservoir which will not be washed completely away by the molten recycled PET 43 during the next stage of the injection cycle. The layer of virgin PET forming the exterior of the preform is given reference 53 while the layer forming the interior surface of the preform is given reference 55 with the volume therebetween being reference 57.

A sufficient quantity of molten virgin PET is supplied to provide a buffer zone 59 at the termination of the neck portion 51 which will ensure that even in the coldest cavity in the multi-cavity mold 1 there is a layer of virgin PET closing the cavity 3 at the neck of the preform. The quantity of virgin PET in the buffer zone 59 will be at a minimum in the cooler cavities usually found adjacent the exterior of the mold as these may be supplied with the virgin PET at a slightly lower temperature (hence greater viscosity and small quantity) than the virgin PET supplied to the warmer cavities usually found adjacent the central region of the mold.

When the desired metered quantity of molten virgin PET 45 has passed through the diverter valve 23 into the manifold system 19, the diverter valves are moved into the position shown in FIG. 1 in which valve 23 is closed and valve 21 is open for the supply of the desired metered quantity of molten recycled PET 43 under the control of ram pot 29 from the plasticizer valve 25. This molten recycled PET 43 forms an interface with the previously metered molten virgin PET 45 similar to that illustrated in FIG. 2 (the order of the recycled and virgin PET being reversed from that figure). This metered quantity of molten recycled PET follows the virgin PET through the identical paths defined by the hot runners of the manifold system 19 to and through the gate 17 of each cavity 3 to fill all of the volume 57 with the exception of the portion of each cavity 3 immediately adjacent its gate 17. The quantity of recycled PET is metered so that the next following metered quantity of molten virgin PET 45, to be used in the next injection cycle, will at the end of the injection cycle here described be able to form a plug 61 closing the base of the preform to ensure that no recycled material is exposed at either the interior or exterior surface of the preform base region. Once this plug 61 has been formed the multi-layer preforms are removed from the mold cavities 3 and the next injection cycle is commenced using the remaining metered quantity of molten virgin PET already present at the gates 17.

With reference to the neck portion illustrated in FIG. 4, the recycled PET 43 is shown terminating (the volume 57 being filled) in the neck portion 51 a distance from the neck termination such as might be found in cavities 3 adjacent the center of the mold. The virgin PET in a lower quantity situation relative to the termination of the recycled PET 43 is shown in ghost at 63. This might be found in a cavity adjacent the exterior of the mold 1 when receiving virgin molten PET 45.

It will be appreciated that the diverter valves may be located in the mold or closely adjacent the mold with he hot runners downstream of these valves forming part of the manifold system.

It is to be appreciated that the first and second materials which are used to form the multi-layered article of the instant invention can be manufactured from two or more materials of different melt viscosities and viscosity differences of approximately ±10%, or even more, are possible. In addition, the temperature sensitivities and the coefficients of friction of the resin materials used to mold the multi-layered article are other important factors to consider in ensuring that the boundary interface between two adjacent resin materials remains intact.

It is also possible that the multi-layered article can be formed from three or more separate, sequentially injected materials or that one of the materials can be a blend of two or more resin materials, e.g. PET and polyethylene naphathalate (PEN). PEN is a high barrier resin that would be useful in achieving a longer shelf life of a container which is manufactured according to the invention.

We claim:
1. A process for the simultaneous injection molding of a plurality of multi-layer articles in a multi-cavity injection mold comprising the steps of:
   a) supplying a metered quantity of a first material to a single hot runner manifold system defining a single path branched into a plurality of paths, each of said plurality of paths communicating with one of a plurality of injection mold cavities for passage therethrough to simultaneously supply equal quantities of said first material to each said cavity;

b) then supplying a metered quantity of a second material contiguously with said first material to said paths to each of said plurality of cavities for passage therethrough, contiguously with said first material, to simultaneously supply equal quantities of said second material to each said cavity;

controlling the temperature of the hot runner manifold system and said cavities to a desired temperature; and operating a valve means to sequentially supply and meter the desired contiguous quantities of said first and said second materials from respective first and second plastic material sources to said single hot runner manifold system for contiguous sequential passage of said first and second materials through said paths.

2. A process according to claim 1 wherein said paths are balanced thereby to facilitate said simultaneous sequential supply of said first and second materials in said equal quantities.

3. A process according to claim 2 wherein said single hot runner manifold system is evenly divided a plurality of times to form a sequence of hot runners, each hot runner leading to a corresponding cavity.

4. A process according to claim 1 wherein each path terminates at its associated cavity and said first and second materials are passed sequentially into each cavity from the associated path by way of a gate means.

5. A process according to claim 1 wherein said manifold system is insulated and said temperature control maintains the manifold system at a temperature to maintain a desired temperature of said material when therein.

6. A process according to claim 1 in which said articles are preforms suitable for being blow molded to form multi-layer containers, each said cavity being defined by a core rod within a female cavity; comprising injecting said first material into each said cavity to form an interior and an exterior layer of said multi-layer preform, in sufficient quantity to provide a buffer quantity of said first material in a neck portion of said preform in each cavity to ensure closure between said layers in the neck region with expected variations of cavity temperatures and first material resulting from temperature variations through said mold from a central region thereof to the exterior thereof; and then injecting said second material between said interior and exterior layers.

7. A process according to claim 4 wherein said articles are preforms suitable for being blow molded to form multi-layer containers and, in each injection cycle of the mold, each cavity being defined by a core rod within a female cavity, comprising simultaneously injecting a quantity of said first material into each cavity to form interior and exterior surface layers of the multi-layer preform, then injecting a quantity of said second material contiguous with and following the quantity of first material between the interior and exterior surface layers to fill each cavity except for a portion thereof adjacent said gate means, and subsequentially injecting a portion of a next metered quantity of said first material which will initiate the next injection cycle in that cavity to seal the base portion of said preform to ensure that after formation thereof, the second material is not exposed.

8. A process according to claim 1, wherein each cavity, for injection molding a multi-layer article, is defined by a core rod disposed within a female cavity portion, connected at a base forming portion of the cavity, the base forming portion defining a center, by way of a gate, with a molding material supply duct disposed adjacent the center of said base forming portion, and providing a base portion of said core rod adjacent said gate with a concavity to accommodate a quantity of a first molding material entering the cavity through said gate; comprising using quantity in each said concavity to prevent washing out of that first material by a second material when subsequentially injected into said cavity.

* * * * *